(12) United States Patent
Kondeti et al.

(10) Patent No.: US 11,997,748 B1
(45) Date of Patent: May 28, 2024

(54) METHODS AND SYSTEMS FOR MT CALL RECOVERY

(71) Applicant: T-Mobile USA, Inc., Bellevue, WA (US)

(72) Inventors: Venkata Satya Sureshkumar Kondeti, Bellevue, WA (US); Karthik Adepalli Sri Lakshmi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/410,889

(22) Filed: Aug. 24, 2021

(51) Int. Cl.
*H04W 8/04* (2009.01)
*H04W 12/03* (2021.01)
*H04W 12/06* (2021.01)
*H04W 80/08* (2009.01)

(52) U.S. Cl.
CPC .............. *H04W 8/04* (2013.01); *H04W 12/03* (2021.01); *H04W 12/06* (2013.01); *H04W 80/08* (2013.01)

(58) Field of Classification Search
CPC ....... H04W 8/04; H04W 12/03; H04W 12/06; H04W 80/08
See application file for complete search history.

(56) References Cited

U.S. PATENT DOCUMENTS 10,469,543 B2  11/2019 Nomani et al.
11,496,526 B2 *  11/2022 Zhang ................. H04L 65/1073
2011/0028130 A1 *  2/2011 Swaminathan ..... H04L 65/1104
                                                              455/414.1
2017/0134444 A1 *  5/2017 Buckley .............. H04L 65/1016
2018/0007612 A1 *  1/2018 Jahangir ............. H04L 65/1073
2018/0332461 A1 *  11/2018 Williams ............. H04L 67/101
2018/0368050 A1 *  12/2018 Chun .................... H04M 15/63

FOREIGN PATENT DOCUMENTS

CN       101106795 B   *   9/2010
KR      20090119983 A   *  11/2009
KR       102065019 B1   *   1/2010  ......... H04L 65/1073
WO    WO-2005020619 A1   *   3/2005  ......... H04L 63/0815

* cited by examiner

*Primary Examiner* — Meng Li
*Assistant Examiner* — Lydia L Noel
(74) *Attorney, Agent, or Firm* — Lee & Hayes, P.C.

(57) ABSTRACT

Methods and systems for MT (mobile terminated) call recovery in an IP multimedia system (IMS) network are discussed herein. A method according to an implementation comprises receiving, via a network, a request to establish a call session with a user equipment (UE); sending, to a first serving call session control function (S-CSCF), a first invite associated with the request; determining that no response is received from the first S-CSCF after a pre-set time period; sending, to a second S-CSCF, a second invite associated with the request, causing the second S-CSCF to perform actions including: obtaining an authentication to establish the call session; and sending, to a proxy call session control function (P-CSCF) of the UE, a third invite associated with the request; and receiving, via the network, a confirmation that the call session with the UE is established.

12 Claims, 7 Drawing Sheets

500

```
AN I-CSCF RECEIVES, VIA A NETWORK, A REQUEST FROM A UE TO
ACCESS A SERVICE, THE REQUEST INCLUDING INFORMATION
ASSOCIATED WITH A P-CSCF OF THE UE
502
```

```
THE I-CSCF GENERATES A FIRST MESSAGE ACCORDING TO THE
REQUEST TO REGISTER THE UE IN THE NETWORK
504
```

```
THE I-CSCF TRANSMITS THE FIRST MESSAGE TO AN S-CSCF
506
```

```
THE S-CSCF OBTAINS, FROM AN HSS, AN AUTHENTICATION TO
PROVIDE THE SERVICE
508
```

```
THE HSS SAVES THE INFORMATION ASSOCIATED WITH THE P-CSCF
OF THE UE
510
```

```
THE I-CSCF RECEIVES, FROM THE S-CSCF, A RESPONSE TO THE
FIRST MESSAGE CONFIRMING THE REGISTRATION OF THE UE
512
```

FIG. 5

METHODS AND SYSTEMS FOR MT CALL RECOVERY

BACKGROUND

IP multimedia subsystem (IMS) is a set of specifications to offer multimedia services through the IP protocol. This makes it possible to incorporate all kinds of services, such as voice, multimedia and data, on an accessible platform through any Internet connection (i.e., fixed or mobile). Before a user can get access to the IP multimedia services (IMS), the user equipment (UE) of the user must register at least one IP multimedia public identity (IMPU), such as a telephone number. The IMS network must then authenticate an IP multimedia private identity (IMPI) at application. The registration process is initiated by an IMS terminal sending a register message to the proxy call session control function (P-CSCF) with contact attribute value pair (AVP) of register to the serving CSCF (S-CSCF).

The information of P-CSCF is cached in the memory of S-CSCF. During the registration, S-CSCF also drops its own identity information on a home subscriber database (HSS) via a server assignment request (SAR). Later, interrogating CSCF (I-CSCF) and HSS interwork to obtain the information of S-CSCF in order to route a mobile-terminated (MT) calls via P-CSCF. S-CSCF uses its cached information of P-CSCF to route the invite to P-CSCF. Since S-CSCF is the only node that has the information on which P-CSCF is serving the UE, when S-CSCF is down, the information of P-CSCF will be lost causing dropped MT calls.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process of registration in an IMS system, according to an embodiment of the present disclosure.

DETAILED DESCRIPTION

Figure 1:
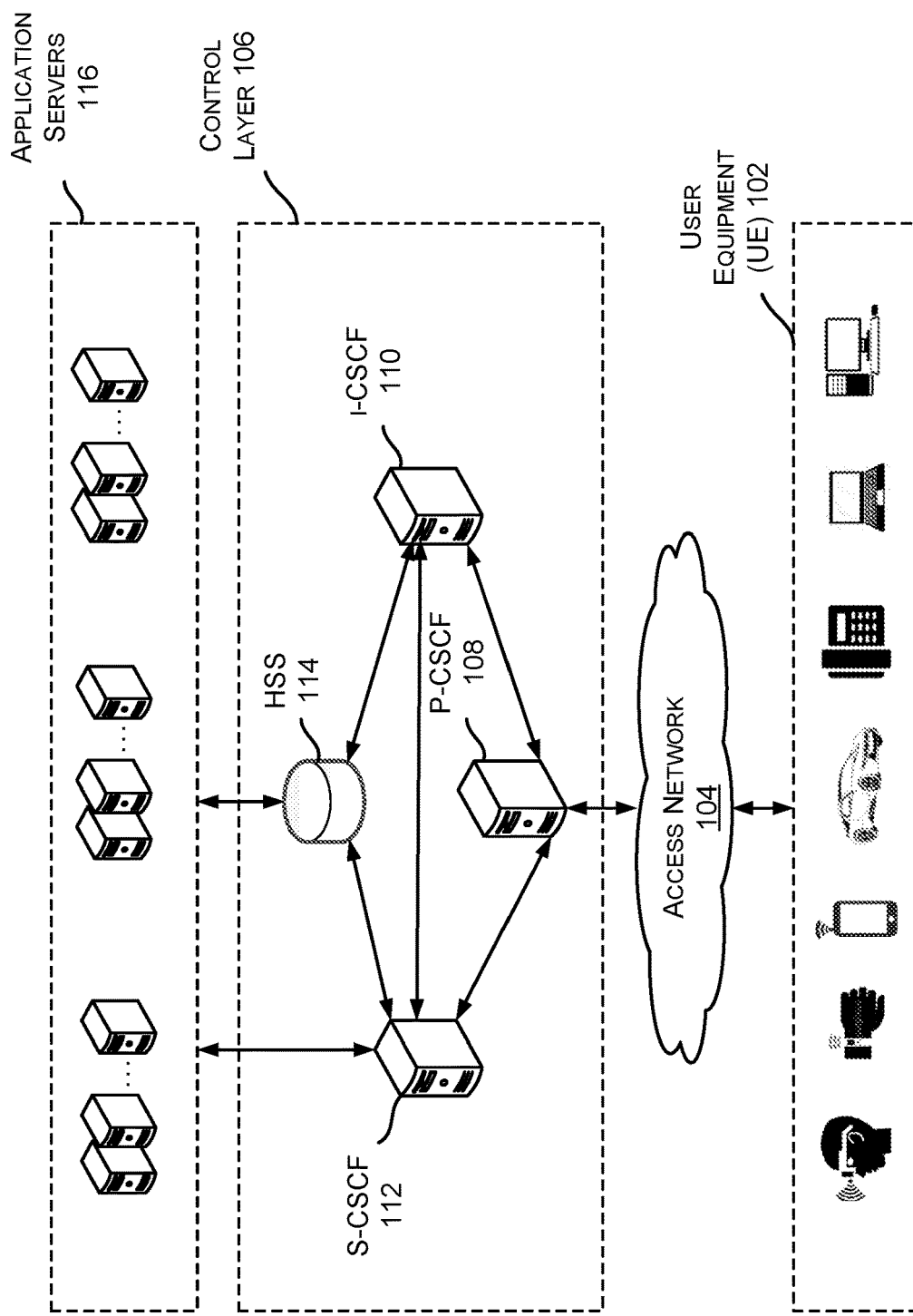
FIG. 1 illustrates an example IMS architecture, in which one or more call session control functions are configured to provide MT call recovery.

Techniques for IP multimedia system (IMS) registration and mobile terminated (MT) call recovery in the IMS network are discussed herein.

In some implementations, a method for IMS registration comprises receiving, via a network, a request from a user equipment (UE) to access a service, the request including information associated with a proxy call session control function (P-CSCF) of the UE; generating a first message according to the request to register the UE in the network; transmitting, to a serving call session control function (S-CSCF), the first message, causing the S-CSCF to perform actions including: obtaining, from a home subscriber database (HSS), an authentication to provide the service; and saving, to the HSS, the information associated with the P-CSCF; and receiving, from the S-CSCF, a response to the first message confirming the registration of the UE.

In some implementations, the information associated with the P-CSCF of the UE includes an IP address of the P-CSCF in the network.

In some implementations, the method for IMS registration further comprises encrypting the IP address of the P-CSCF using a first attribute value pair (AVP); and generating the first message to include the IP address of the P-CSCF encrypted using the first AVP.

In some implementations, the method for IMS registration further comprises causing the S-CSCF to perform actions further including: decrypting the IP address of the P-CSCF from the first message; encrypting the IP address of the P-CSCF using a second AVP; and sending, to the HSS, a second message to authenticate the access of the IMS service, the second message including the IP address of the P-CSCF encrypted using the second AVP.

In some implementations, the service is an IP multimedia (IMS) service provided via the network.

In some implementations, a method for MT call recovery comprises receiving, via a network, a request to establish a call session with a user equipment (UE); sending, to a first S-CSCF, a first invite associated with the request; determining that no response is received from the first S-CSCF after a pre-set time period; sending, to a second S-CSCF, a second invite associated with the request, causing the second S-CSCF to perform actions including: obtaining an authentication to establish the call session; and sending, to a proxy call session control device (P-CSCF) of the UE, a third invite associated with the request; and receiving, via the network, a confirmation that the call session with the UE is established.

In some implementations, the method for MT call recovery further comprises pre-registering, via a third S-CSCF, the UE in the network, including: receiving, via the network, a first request to access a service from the UE, the first request including information associated with the P-CSCF of the UE; generating a first message according to the first request to register the UE in the network; transmitting, to the third S-CSCF, the first message, causing the third S-CSCF to perform actions including: obtaining, from a home subscriber database (HSS), an authentication to provide the service; and saving, to the HSS, the information associated with the P-CSCF; and receiving, from the third S-CSCF, a response to the first message confirming the registration of the UE.

In some implementations, the method for MT call recovery further comprises obtaining, from the HSS, the information associated with the P-CSCF of the UE; and sending, to the second S-CSCF, the second invite including the information associated with the P-CSCF of the UE.

In some implementations, the second invite includes one or more parameters to restore the call session, and the second S-CSCF is caused to perform actions further including: obtaining, from the HSS, the information associated with the P-CSCF of the UE.

In some implementations, the second S-CSCF is caused to perform actions further including: sending, to a telephony application server (TAS), a fourth invite associated with the request, causing the TAS to establish the call session.

In some examples, the use of the terms such as, P-CSCF, S-CSCF, I-CSCF, HSS, TAS, etc., is intended to include any different named 5G equivalents or later generation equivalents.

In some examples, the network implementations may support standalone architectures, non-standalone architectures, dual connectivity, carrier aggregation, etc. Example implementations are provided below with reference to the following figures.

FIG. 1 illustrates an example IMS architecture, in which one or more call session control functions are configured to provide MT call recovery.

The IMS architecture 100 may be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The IMS architecture 100 may include various layers according to the functions being performed and/or services being provided. User equipment (UE) 102 may be referred to as a UE layer or a device layer. The UE 102 may be any device that can connect to a telecommunication network through a wired or wireless connection. In some examples, the UE 102 may be a mobile device, such as a cellular phone or a smart phone. In other examples, the UE 102 may be a traditional landline phone. In other examples, the UE 102 may be an IP phone. In yet other examples, the UE 102 may be a personal digital assistant (PDA), a media player, a tablet computer, a gaming device, a personal computer (PC) such as a laptop, desktop, or workstation, or any other type of computing or communication device. In some examples, the UE 102 may include the computing devices implemented on the vehicle such as an autonomous vehicle or a self-driving vehicle. In some examples, the UE 102 may be a wearable device such as a smart watch, smart glasses, etc.

The IMS architecture 100 may further include an access layer, i.e., an access network 104 that provides access points to the UE 102. The access network 104 may include different access technology-based networks and/or facilities. For example, traditional landline phones may access the telecommunication network via a public switched telephone network (PSTN). In implementations, the access network 104 may further include a PSTN Gateway to provide signaling interworking and information translation between PSTN and IP based system. In some examples, the access network 104 may include digital subscriber line (DSL) and variations of DSL technology that provide access to desktops, workstations, and/or mainframes. In other examples, the access network 104 may include session initiation protocol (SIP) to establish connections between Voice-over-IP telephones. In yet other examples, the access network 104 may include Wi-Fi connections to the mobile devices, PDA, gaming devices, autonomous vehicles, wearable devices, etc. In yet other examples, the access network 104 may support a full range of radio access technologies including but not limited to GSM, CDMA, GPRS, UMTS, WiMAX, 4G, LTE, 5G NR, etc.

The IMS architecture 100 may further include a control layer 106 that provides session control functions in the IMS system. The control layer 106 may include a proxy call session control functions (P-CSCF) 108, an interrogating call session control functions (I-CSCF) 110, a serving call session control functions (S-CSCF) 112, and a home subscriber database (HSS) 114. The P-CSCF 108 is an edge access function of the IMS system and serves as an entry point for the UE 102 to request services from the IMS system. The P-CSCF 108 acts as a proxy server configured to accept incoming requests and forward the incoming requests to an entity (i.e., the S-CSCF 112) of the IMS system that can provide the service as requested. The I-CSCF 110 is responsible for onward routing of the session initiation protocol (SIP) messages to an appropriate S-CSCF 112 according to the service being requested. This routing capability is utilized in specific scenarios only, such as during IMS registration in order to assign or ascertain the S-CSCF 112 that should be used to provide the service. The I-CSCF 110 may be also configured to route the SIP requests arriving from other SIP networks. The I-CSCF 110 queries the HSS 114 in order to discover the location of S-CSCF 112 that a particular subscriber has been assigned to. In some examples, the location of S-CSCF 112 may refer to an IP address of the S-CSCF 112 in the network. The S-CSCF 112 is the primary entity in the IMS system responsible for the session control. Subscribers will be allocated with an appropriate S-CSCF for the duration of their IMS registration in order to facilitate routing of the SIP messages as part of service establishment procedures. The HSS 114 is the main database of the IMS systems and contains subscriber-related information, such as the authentication information and the list of services to which each user is subscribed to. To access the services in the IMS system, the subscriber or the user must register his/her identify through the UE 102 and the access network 104. During the IMS registration period, an appropriate S-CSCF is assigned to the subscriber to provide the services. The identify information of the subscriber and information associated with the assigned S-CSCF are both saved in HSS 114.

The IMS architecture 100 may further include one or more application servers 116. The application servers 116 host and execute the IMS service logic. The application servers 116 can be SIP application servers, open services architecture (OSA) application servers, or a customized applications for mobile networks using enhanced logic (Camel) service environment, etc.

It should be appreciated that the IMS architecture 100 is merely for the illustrative purposes. An IMS system may include other entities other than those described above. The present disclosure is not intended to be limiting.

Figure 2:
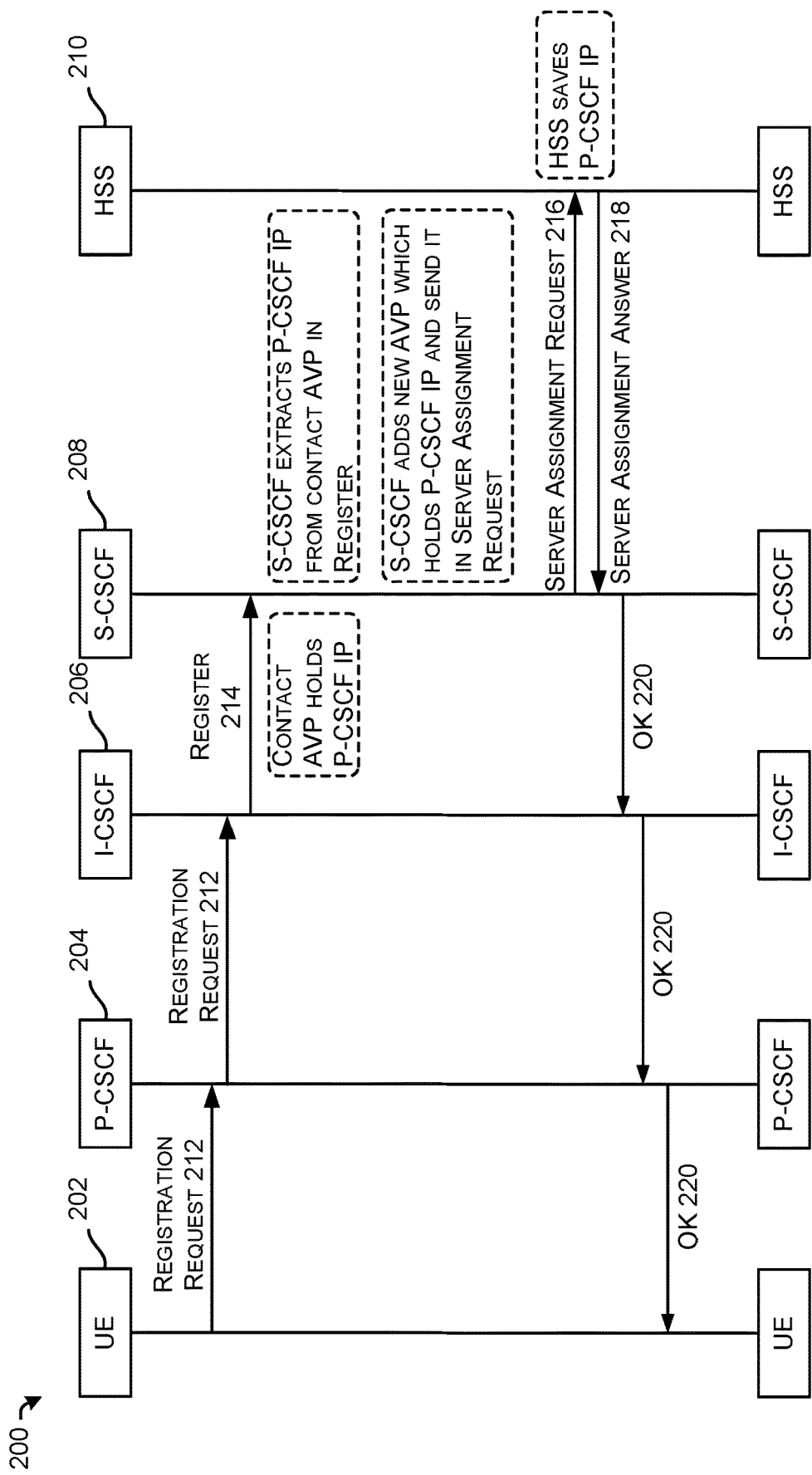
FIG. 2 illustrates an example registration flow in an IMS system.

FIG. 2 illustrates an example registration flow in an IMS system.

In a 5G IMS system, a subscriber or a user may register an identify in the network via the user equipment (UE) before the user can use the services. The UE 202 may transmit a registration request 212 to the IMS system via a proxy device. In implementations, the proxy device of the UE, through which the UE can access the services of the IMS system may be P-CSCF 204. The P-CSCF 204 may forward the registration request 212 to I-CSCF 206. Upon receiving the request, the I-CSCF 206 may encrypt the identify information associated with the subscriber (i.e., the UE 202) and the proxy device (i.e., the P-CSCF 204) using a contact attribute value pair (AVP) and generate a register message 214. The register message 214 is transmitted to the S-CSCF 208. The S-CSCF 208 may extract the identify information associated with the subscriber and the proxy device from the contact AVP in the register message and encrypt the same information (i.e., the identify information associated with the subscriber and the proxy device) using a new AVP. The S-CSCF 208 may transmit a server assignment request (SAR) 216 to the HSS 210. The SAR 216 includes the identify information associated with the subscriber and the proxy device encrypted using the new AVP. In some examples, the SAR 216 may also include the identify information of the S-CSCF 208. The HSS 210 may check the identify information associated with the subscriber and the proxy device and return a server assignment answer (SAA) 218 to the S-CSCF 208. When receiving the SAA 218, the S-CSCF 208 completes the registration process by returning an OK message 220 to the I-CSCF 206, the P-CSCF 204, and the UE 202.

It should be appreciated that the encryption of the information associated with the subscriber and the proxy device using the attribute value pair (AVP) described above is merely for illustrative purposes. Such information can be encrypted using any key-pair technologies and/or algorithms. The present disclosure is not intended to be limiting.

During the IMS registration, the S-CSCF 204 may cache the information associated with the subscriber and the proxy device in its memory. In some examples, the S-CSCF 204 may cache the IP address of the proxy device, i.e., the P-CSCF 204. The HSS 210 may save the identify information of the S-CSCF 204 upon receiving the server assignment request 216. When a mobile-terminated (MT) call is received from an initiating party, the HSS 210 may interwork with the I-CSCF 206 to locate the S-CSCF 208 in order to route the MT call to a destination party (i.e., another UE). The S-CSCF 208 may use the cached IP address of the proxy device of the destination party to route the MT call.

As discussed herein, the information associated with the proxy device of a UE is only saved at the local memory of S-CSCF. When the S-CSCF is unavailable, the information associated with the proxy device (i.e., the IP address of the P-CSCF 204) becomes unavailable, thus causing the MT call being lost. Thus, in implementations, the HSS 210 may extract the information associated with the proxy device from the server assignment request 216 and save the information associated with the proxy device in its local memory. When the information associated with the proxy device cannot be obtained from the S-CSCF 208, the HSS 210 is able to provide the information to route the MT call in the IMS system.

Figure 3:
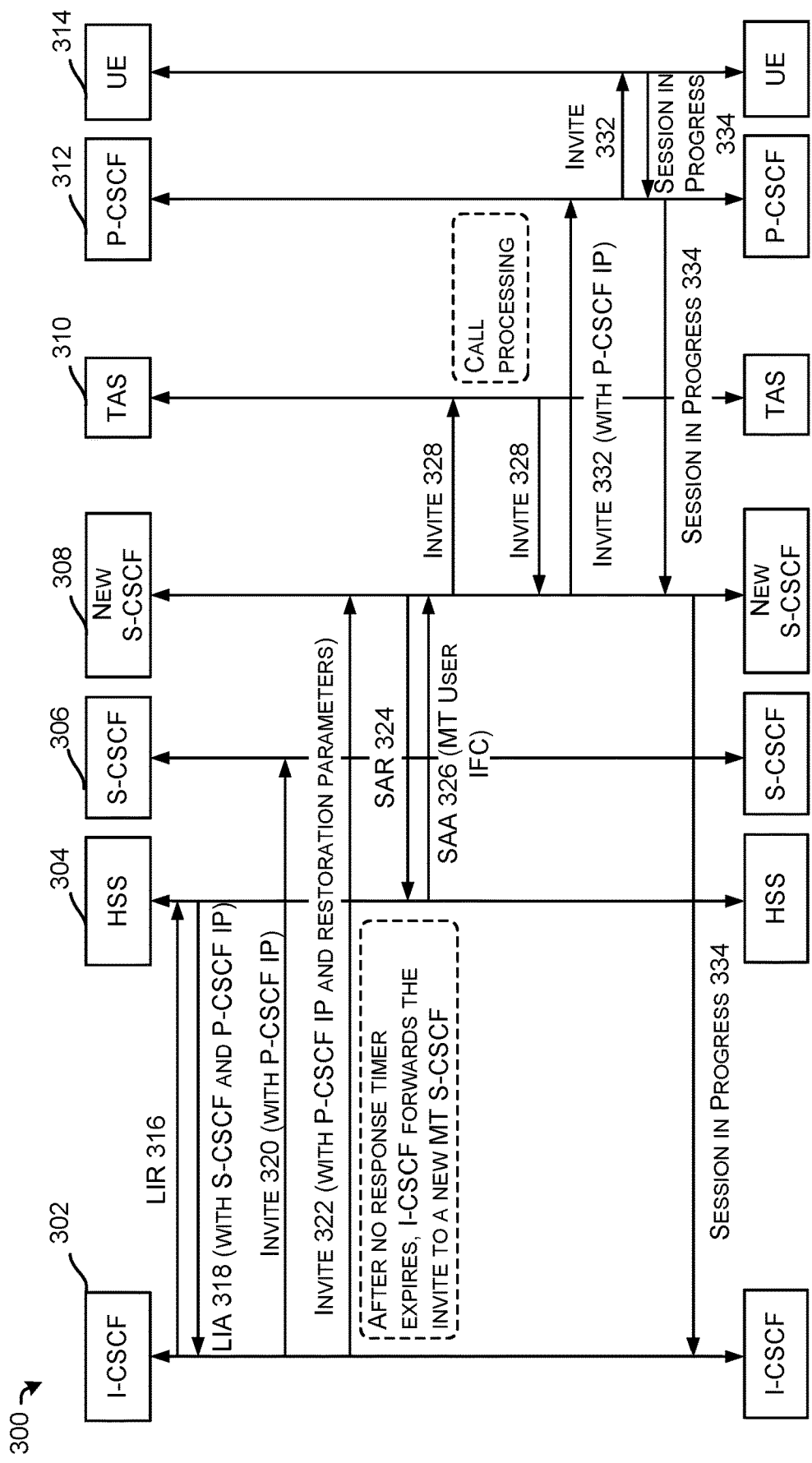
FIG. 3 illustrates an example MT call recovery flow in an IMS system.

FIG. 3 illustrates an example MT call recovery flow in an IMS system.

The example MT call recovery flow 300 shows the message exchanges between various call cession control functions, the home subscriber database (HSS), the telephony application server (TAS), and the UE at the call destination party. The MT call initiating flow at the call initiating party is not shown.

As illustrated in FIG. 3, the I-CSCF 302 may receive a call invite from an initiating party S-CSCF (not shown) to establish a call session with a destination party. The I-CSCF 302 may transmit a location-info-request (LIR) 316 to the HSS 304 to discover the location of the destination party in the IMS system. The HSS 304 may return a location-info-answer (LIA) 318 to the I-CSCF 302. As discussed herein, the HSS 304 stores the identify information associated with the subscribers, the location information associated with the proxy device (i.e., the P-CSCF 204 shown in FIG. 2) of the subscribers (i.e., the UE 202 shown in FIG. 2), and the S-CSCF (i.e., the S-CSCF 208 shown in FIG. 2) that has been assigned to the subscribers. Upon receiving the location-info-request (LIR) 316, the HSS 304 searches the database to discover the information associated with the destination party (i.e., the destination UE 314) and its proxy CSCF (i.e., P-CSCF 312). The HSS 304 returns the location-info-answer (LIA) 318 including the information associated with the P-CSCF, through which, the destination party accesses the IMS service.

The I-CSCF 302 may further transmit an invite message 320 to the S-CSCF (i.e., S-CSCF 306), as indicated in the LIA 316. The invite message 320 may further include the information associated with the proxy CSCF (i.e., the P-CSCF 312) of the destination party (i.e., the UE 314). The I-CSCF 302 may set a no response timer. If the I-CSCF 302 receives a message indicating the call session in progress before the no response timer expires, the call session is established successfully. If after the no response timer expires, no message indicating the call session in progress is received, the I-CSCF 302 may transmit a new invite message 322 to a new S-CSCF (i.e., new S-CSCF 308). The new invite message 322 may include one or more restoration parameters to restore the call invite. In some examples, the new invite message may further include the information associated with the proxy CSCF (i.e., the P-CSCF 312) of the destination party (i.e., the UE 314).

Upon receiving the new invite message 322, the new S-CSCF 308 may transmit the server assignment request (SAR) 324 to the HSS 304 to authenticate the server assignment. The new S-CSCF 308 further receives a server assignment answer (SAA) 326 from the HSS 304. The server assignment answer (SAA) 326 may include initial filter criteria (IFC) associated with the subscriber or user. The IFC is provisioned in HSS 304, as part of the profile information associated with the subscribers. The IFC may include a set of trigger definitions, indicating the SIP methods that a service should be triggered. The IFC may be defined for different call cases, including but not limited to, an originating request, a terminating request, an originating request for a subscriber who is not registered, a terminating request for a subscriber who is not registered, a retargeted call, etc.

Once the server assignment is authenticated by the HSS 304, the new S-CSCF 308 may transmit an invite message 332 to the proxy CSCF (i.e., P-CSCF 312). The P-CSCF 312 then forwards the invite message 332 to the destination party (i.e., the UE 314). In implementations, the new S-CSCF 308 may exchange the invite message 328 with a telephony application server (TAS) to process the call and execute the terminating service. The destination party (i.e., the UE 314) may then return a message 334 indicating the call session in progress to the I-CSCF 302.

Figure 4:
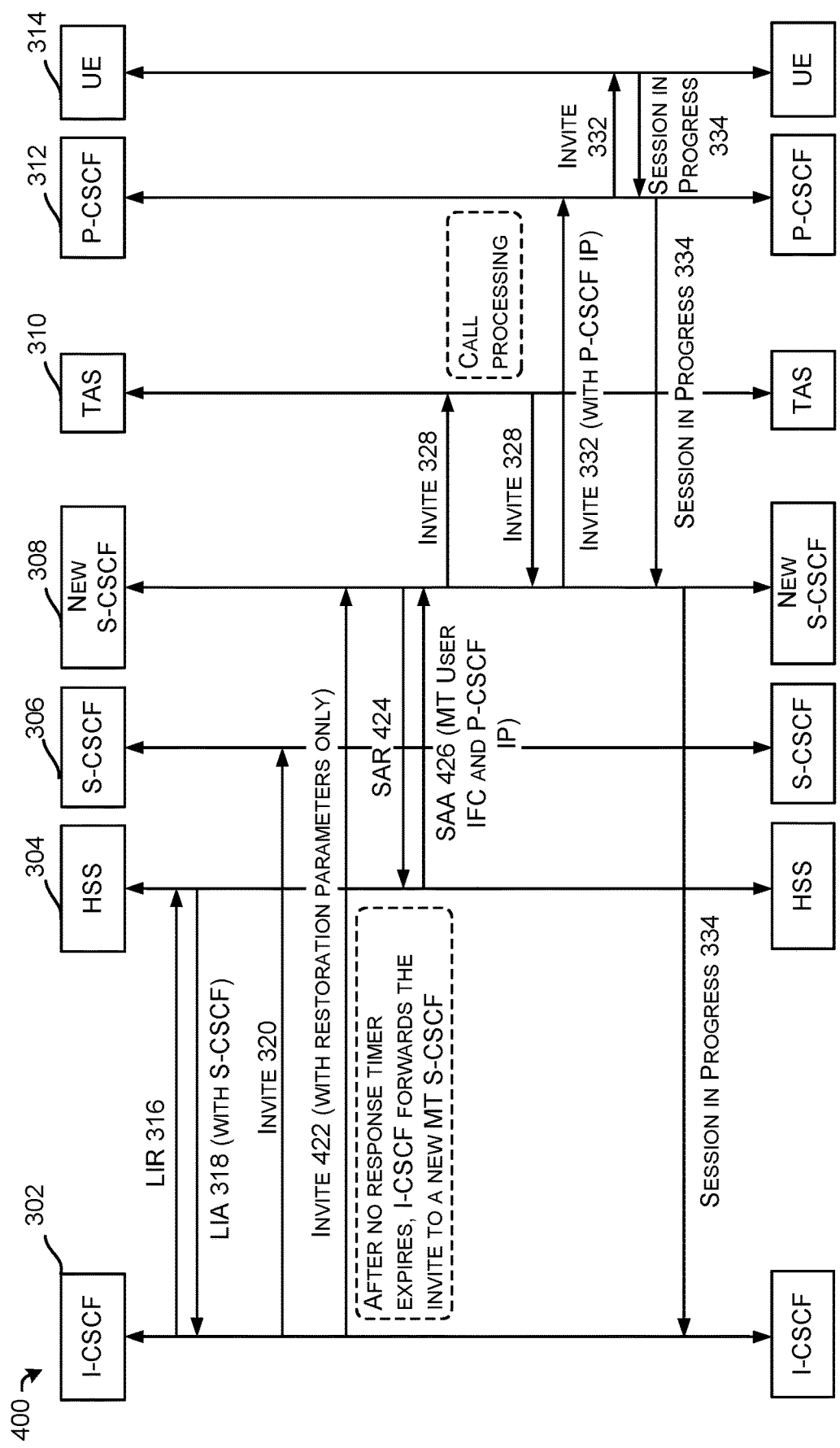
FIG. 4 illustrates another example MT call recovery flow in an IMS system.

FIG. 4 illustrates another example MT call recovery flow in an IMS system.

The example MT call recovery flow 400 shown in FIG. 4 is similar to the example MT call recovery flow 300 shown in FIG. 3. According to the embodiment illustrated in FIG. 4, upon receiving a call invite from an initiating party S-CSCF, the I-CSCF 302 may transmit a location-info-request (LIR) 316 to the HSS 304 to discover the location of the destination party in the IMS system. The HSS 304 may return a location-info-answer (LIA) 318 to the I-CSCF 302. The LIA 318 may include information of the S-CSCF (i.e., the S-CSCF 208 shown in FIG. 2) that has been assigned to the destination party. After the no response timer expires, the I-CSCF 302 may transmit a new invite message 422 to the new S-CSCF 308. The new invite message 422 includes only one or more restoration parameters but does not include the information associated with the proxy CSCF (i.e., P-CSCF 312). The new S-CSCF 308 may transmit the server assignment request (SAR) 424 to the HSS 304, requesting for the information associated with the P-CSCF 312 in order to route the MT call. In response, the HSS 304 may return the server assignment answer (SAA) 426 including the information associated with the P-CSCF 312.

FIG. 5 illustrates an example process of registration in an IMS system, according to an embodiment of the present disclosure.

The example process 500 corresponds to the registration flow in the IMS system shown in FIG. 2 and may be performed by the interrogating CSCF, the serving CSCF, and proxy CSCF, the home subscriber database (HSS), and the user equipment (UE), as illustrated in FIGS. 1-2.

At operation 502, an interrogating call session control function (I-CSCF) receives, via a network, a request from a UE to access a service, the request including information associated with a proxy call session control function (P-CSCF) of the UE. In some examples, the network may be compatible with any radio access technology and implemented with an IMS architecture. The interrogating call session control function may be referred to I-CSCF 110 shown in FIG. 1 and I-CSCF 206 shown in FIG. 2. As discussed herein, the UE access the service in the IMS system via the P-CSCF that acts as a proxy server for the UE. The information associated with the P-CSCF of the UE may include an IP address of the P-CSCF in the IMS system.

At operation 504, the I-CSCF generates a first message according to the request to register the UE in the network. As discussed herein, the first message may include the information associated with the UE and its P-CSCF. In some examples, the information may include an identity of the UE, an identify of the P-CSCF, an IP address of the P-CSCF in the IMS system, etc. In implementations, such information in encrypted in the first message. In some examples, such information is encrypted by a contact attribute value pair (AVP) and stored in the first message.

At operation 506, the I-CSCF transmits the first message to a serving call session control function (S-CSCF). The serving call session control function may be referred to the S-CSCF 112 shown in FIG. 1 and the S-CSCF 208 shown in FIG. 2.

At operation 508, the S-CSCF obtains, from a home subscriber database (HSS), an authentication to provide the service. The S-CSCF may extract the information encrypted in the first message and re-encrypt the information using a new attribute value pair (AVP). That is, the identify information of the UE and the identify information and the IP address of the P-CSCF is re-encrypted by the new AVP and sent to the HSS. In implementation, the HSS may refer to the HSS 114 shown in FIG. 1 and the HSS 210 shown in FIG. 2. As discussed herein, during the registration process, the HSS stores information related to the subscribers, the P-CSCF of the subscribers, the S-CSCF that has been assigned to the subscribers during the IMS registration, etc.

At operation 510, the HSS saves the information associated with the P-CSCF of the UE. As discussed herein, in current registration process, the S-CSCF caches the information associated with the proxy device (i.e., the proxy CSCF) in its memory and does not transmit such information to HSS. When the S-CSCF is unreachable, the information of the proxy CSCF (normally, the IP address of the P-CSCF) cannot be obtained. Thus, an MT call to a UE that accesses the service through the proxy CSCF cannot be routed and will be lost. According to the present disclosure, in addition to caching the information of the proxy CSCF in its memory, the S-CSCF (i.e., the S-CSCF 208 shown in FIG. 2) also transmits the information to the HSS (i.e., the HSS 210 shown in FIG. 2) to be saved in the database of the HSS. Even if the S-CSCF is unavailable to provide the information of the proxy CSCF, the HSS can still provide the information to route the MT call to the destination UE.

At operation 512, the I-CSCF receives, from the S-CSCF, a response to the first message confirming the registration of the UE.

Figure 6:
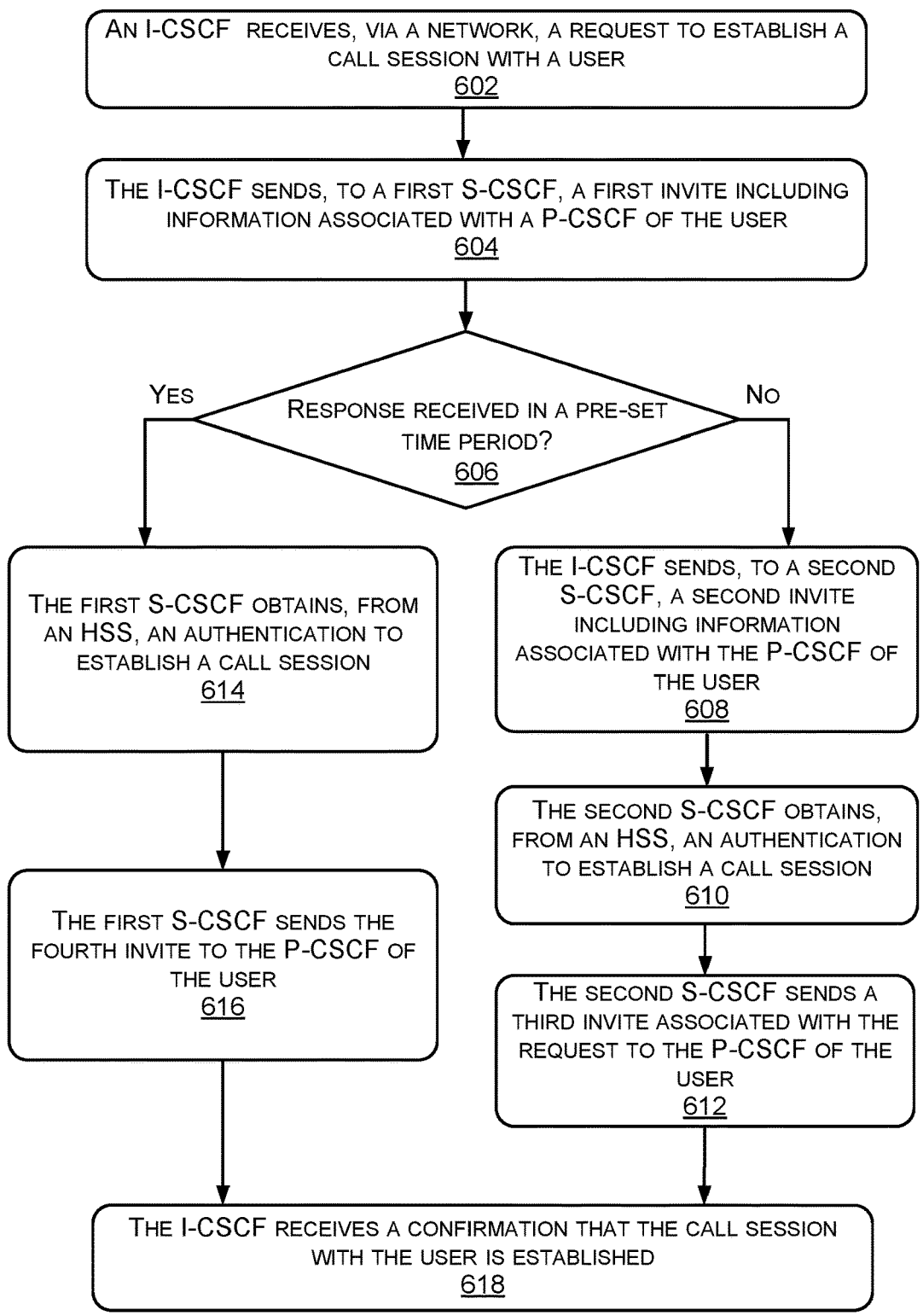
FIG. 6 illustrates an example process of MT call recovery in an IMS system, according to an embodiment of the present disclosure.

FIG. 6 illustrates an example process of MT call recovery in an IMS system, according to an embodiment of the present disclosure.

The example process 600 corresponds to the example MT call recovery flow shown in FIG. 3. The example process 600 may be performed by the interrogating CSCF 302, the serving CSCF 306 and 308, and proxy CSCF 312, the home subscriber database (HSS) 304, the user equipment (UE) 314, and the telephony application server (TAS) 310, as illustrated in FIG. 3. As discussed herein, the example process of MT call recovery shows the flow between various entities at the call destination party, such as the interrogating CSCF, the proxy CSCF, the serving CSCF, the home subscriber database (HS), the telephony application server (TAS), and the UE. The MT call initiating flow at the call initiating party is not described herein.

At operation 602, an interrogating call session control function (I-CSCF) receives, via a network, a request to establish a call session with a user. The interrogating call session control function may refer to the I-CSCF 302 as shown in FIG. 3. The request to establish a call session may be a terminating request or a terminating call. In some examples, the terminating call may be referred to the routing of calls from one carrier or provider to another. Calls usually initiated as VoIP calls are terminated using the public switched telephone network (PSTN). In some examples, the terminating call may be directed to a registered subscriber or user. In yet other examples, the terminating call may be directed to a subscriber or user who is not registered in the IMS system. The registration in the IMS system is described in connection with FIG. 2 and FIG. 5. The user herein may be referred to a subscriber that subscribes to various services provided through the IMS network.

At operation 604, the I-CSCF sends, to a first serving CSCF, a first invite including information associated with a proxy call session control function (P-CSCF) of the user. The first serving CSCF may be referred to the S-CSCF 306 as shown in FIG. 3. Upon receiving the request, the I-CSCF queries a home subscriber database (HSS) about the location of the user in the IMS network. In implementations, the I-CSCF generates a location-info-request (LIR) and sends the LIR to the HSS. If the user is a registered subscriber, the HSS returns a location-info-answer (LIA) with the location information of the subscriber. In some examples, the location information of the subscriber also includes an IP address of the P-CSCF, through which the subscriber accesses the service in the IMS system. The I-CSCF then forwards the first invite with the IP address of the P-CSCF to the first S-CSCF.

At operation 606, the I-CSCF determines whether a response is received in a pre-set time period. The I-CSCF may set a no response timer to wait for a message indicating the first S-CSCF is operating.

If within the pre-set time period, the I-CSCF receives no message, the I-CSCF sends, to a second S-CSCF, a second invite including information associated with the P-CSCF of the user, as illustrated at operation 608. The second S-CSCF herein may be referred to the new serving CSCF 308 as shown in FIG. 3. The I-CSCF includes the IP address of the P-CSCF of the user in the second invite so that the second S-CSCF can route the MT call.

At operation 610, the second S-CSCF obtains an authentication to establish a call session. As discussed herein, the second S-CSCF (i.e., the new S-CSCF 308 shown in FIG. 3) needs to be assigned by the HSS to provide the service to the user. In some examples, the second S-CSCF sends a server assignment request (SAR) to the HSS (i.e., the HSS 304 as shown in FIG. 3) to obtain the authentication. If the second S-CSCF is the appropriate S-CSCF to provide the service, the HSS returns a server assignment answer (SAA) to the second S-CSCF. In some examples, the SAA may further include the initial filter criteria (IFC) associated with the subscriber or user. As discussed herein, the IFC is stored in the HSS, as part of the profile information associated with the subscribers. The IFC may include a set of trigger definitions, indicating the SIP methods that a service should be triggered.

At operation 612, the second S-CSCF sends a third invite associated with the request to the P-CSCF of the user. The third invite may also include the information associated with the P-CSCF, i.e., the IP address of the P-CSCF in the IMS system.

If within the pre-set time period, the I-CSCF receives the message indicating the first S-CSCF is operating, the first S-CSCF obtains an authentication to establish a call session at operation 614. To obtain the authentication, the first S-CSCF (i.e., the S-CSCF 306 as shown in FIG. 3) may perform similar steps as described with respect to the second S-CSCF (i.e., the new S-CSCF 308 as shown in FIG. 3).

At operation 616, the first S-CSCF sends the fourth invite to the P-CSCF of the user. With the location information associated with the P-CSCF of the user, the first S-CSCF can route the request to establish a call with the user through the P-CSCF.

At operation 618, the I-CSCF receives a confirmation that the call session with the UE is established. As discussed above, the example process 600 merely describes the MT call recovery process when the first S-CSCF is not responding at the destination party. The confirmation that the call session with the UE is established is further forwarded to the initiating party (i.e., the initiating UE) through its proxy CSCF.

Figure 7:
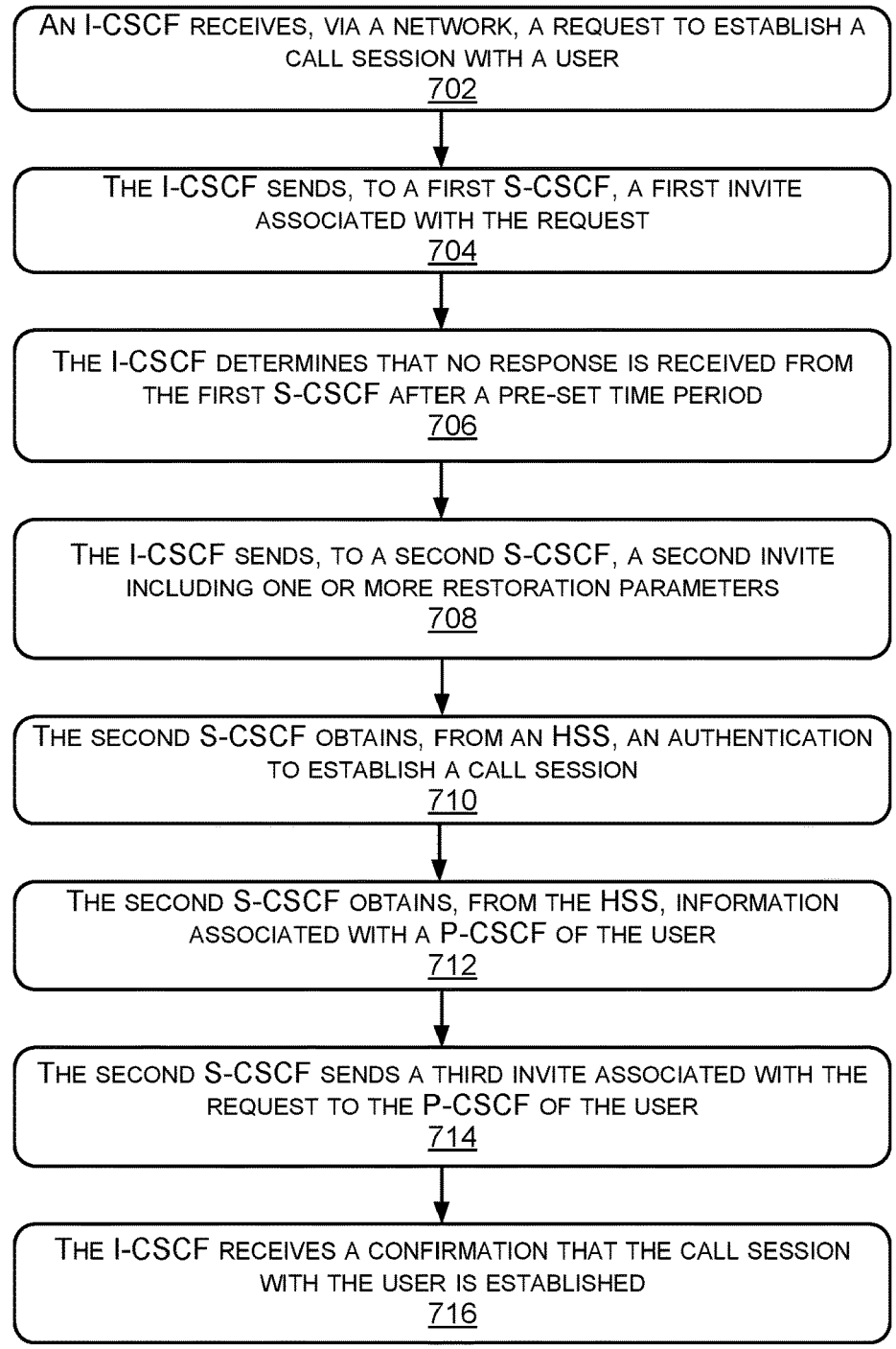
FIG. 7 illustrates another example process of MT call recovery in an IMS system, according to an embodiment of the present disclosure.

FIG. 7 illustrates another example process of MT call recovery in an IMS system, according to an embodiment of the present disclosure.

The example process corresponds to the example MT call recovery flow shown in FIG. 4. The example process 700 may be performed by the interrogating CSCF 302, the serving CSCF 306 and 308, and proxy CSCF 312, the home subscriber database (HSS) 304, the user equipment (UE) 314, and the telephony application server (TAS) 310, as illustrated in FIG. 4.

At operation 702, an interrogating call session control function (I-CSCF) receives, via a network, a request to establish a call session with a user. Similar to operation 602 of FIG. 6, the interrogating call session control function may be referred to the I-CSCF 302 as shown in FIG. 4. The request to establish a call session may be a terminating request or a terminating call. The I-CSCF may send a location-info-request (i.e., LIR 316 in FIG. 4) to an HSS (i.e., HSS 304 in FIG. 4). The I-CSCF receives a location-info-answer (i.e., LIA 318 in FIG. 4) from the HSS. The LIA includes information of an S-CSCF assigned to establish the call session.

At operation 704, the I-CSCF sends, to a first serving CSCF (S-CSCF), a first invite associated with the request. As discussed herein, the request to establish the call session includes identify information of the user, for example, a telephone number of the user. The user's telephone number may be associated with one or more UEs. Upon receiving the first invite (i.e., invite 320 in FIG. 4), the first S-CSCF may query the HSS via a server assignment request (SAR) for information of a proxy device of the UE. The HSS may send the information of the proxy device (i.e., the P-CSCF) back to the first S-CSCF via a server assignment answer (SAA). The first S-CSCF may further forward the invite to the UE through the P-CSCF to establish the call session.

At operation 706, the I-CSCF determines that no response is received from the first S-CSCF after a pre-set time period. The I-CSCF sets a no response timer to determine whether the first S-CSCF is operating normally. When the no response timer expires, the I-CSCF determines that the call session is not established via the first S-CSCF and selects a new S-CSCF to route the request.

At operation 708, the I-CSCF sends, to a second S-CSCF, a second invite including one or more restoration parameters. When the no response timer expires, the I-CSCF sends a second invite to the second S-CSCF (i.e., the new S-CSCF 308 shown in FIG. 3 and FIG. 4). According to the present example, the second invite may only include the request with one or more restoration parameters to resume the request to establish the call session. Different from the examples described with respect to FIG. 4 and FIG. 6, the I-CSCF does not send the information associated with the P-CSCF of the UE (i.e., the IP address of the P-CSCF) to the second S-CSCF.

At operation 710, the second S-CSCF obtains, from an HSS, an authentication to establish a call session. Similar to operation 610 in FIG. 6, the second S-CSCF (i.e., the new S-CSCF 308 shown in FIG. 3 and FIG. 4) obtains the authentication from a home subscriber database (HSS) by sending a server assignment request (SAR).

At operation 712, the second S-CSCF obtains, from the HSS, information associated with the P-CSCF of the UE. As the second S-CSCF (i.e., the new S-CSCF) does not have the information of the P-CSCF that serves the user, the second S-CSCF queries such information from HSS when sending the server assignment request (SAR). The HSS then returns the server assignment answer (SAA), which includes the information of the P-CSCF that serves the user.

At operation 714, the second S-CSCF sends a third invite associated with the request to the P-CSCF of the user. As discussed herein, with the IP address of the P-CSCF that serves the user during registration, the second S-CSCF (i.e., the new S-CSCF 308 shown in FIG. 3) can route the request to establish a call session to the user. In implementations, the second S-CSCF also interworks with a telephony application server (TAS) to establish the call session and process the terminating call.

At operation 716, the I-CSCF receives a confirmation that the call session with the user is established. As discussed above, the example process 700 merely describes the MT call recovery process when the S-CSCF is not responding at the destination party. The confirmation that the call session with the UE is established is further forwarded to the initiating party (i.e., the initiating UE) through its proxy CSCF.

The present disclosure provides solutions to establish a mobile-terminated (MT) call even when the serving CSCF is not responding to the call request. To achieve this, the present disclosure modifies the IMS registration to store the location information of the proxy CSCF not only in the serving CSCF but also in the home subscriber database (HSS). When an MT call request is received, the interrogating CSCF can query the HSS to assign a serving CSCF for the requested service and find the location information of the proxy CSCF to route the MT call to the destination UE through the proxy CSCF. When the serving CSCF is not responding, the interrogating CSCF can forward the call invite with the location information of the proxy CSCF to a new serving CSCF to route the MT call. Alternatively, when the serving CSCF is not responding, the interrogating CSCF can forward the call invite with only the restoration parameters to a new serving CSCF. The new serving CSCF can query the HSS to obtain the location information of the proxy CSCF to route the MT call. The present disclosure efficiently prevents the MT call drops due to the serving CSCF failure.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented by an interrogating call session control function (I-CSCF), comprising:
   pre-registering, via a first serving call session control function (S-CSCF), the a user equipment (UE) in a network, including:
      receiving, via the network, a first request to access a service from the UE, the first request including an Internet Protocol (IP) address of a proxy call session control function (P-CSCF) associated with the UE;
      generating a first message according to the first request to register the UE in the network;
      transmitting, to the first S-CSCF, the first message, causing the first S-CSCF to perform actions including:
         obtaining, from a home subscriber database (HSS), an authentication to provide the service; and
         saving, to the HSS, the IP address of the P-CSCF;
      receiving, from the first S-CSCF, a response to the first message confirming the registration of the UE;
   receiving, via a network, a second request to establish a call session with the UE;
   obtaining, from the HSS, the IP address of the P-CSCF of the UE;
   sending, to a second S-CSCF, a first invite associated with the second request;
   determining that no response is received from the second S-CSCF after a pre-set time period;
   sending, to a third S-CSCF, a second invite associated with the second request, the second invite including the IP address of the P-CSCF of the UE and causing the third S-CSCF to perform actions including:
      obtaining an authentication to establish the call session; and
      sending, to the P-CSCF associated with the UE, a third invite associated with the second request; and
   receiving, via the network, a confirmation that the call session with the UE is established.

2. The method of claim 1, further comprising:
   encrypting the IP address of the P-CSCF using a first attribute value pair (AVP); and
   generating the first message to include the IP address of the P-CSCF encrypted using the first AVP.

3. The method of claim 2, wherein transmitting, to the first S-CSCF, the first message, causing the first S-CSCF to perform actions further including:
   decrypting the IP address of the P-CSCF from the first message;
   encrypting the IP address of the P-CSCF using a second AVP; and
   sending, to the HSS, a second message to authenticate the access of the service, the second message including the IP address of the P-CSCF encrypted using the second AVP.

4. The method of claim 1, wherein the second invite includes one or more parameters to restore the call session, and the third S-CSCF is caused to perform actions further including:
   obtaining, from the HSS, the IP address of the P-CSCF of the UE; and sending, to the third S-CSCF, the second invite including the IP address of the P-CSCF of the UE.

5. The method of claim 1, wherein the third S-CSCF is caused to perform actions further including:
sending, to a telephony application server (TAS), a fourth invite associated with the second request, causing the TAS to establish the call session.

6. A device implementing an interrogating call session control function (I-CSCF), comprising:
a processor, and
a memory storing instructions executed by the processor to perform actions of the I-CSCF including:
pre-registering, via a first serving call session control function (S-CSCF), the a user equipment (UE) in a network, including:
receiving, via the network, a first request to access a service from the UE, the first request including an Internet Protocol (IP) address of a proxy call session control function (P-CSCF) associated with the UE;
generating a first message according to the first request to register the UE in the network;
transmitting, to the first S-CSCF, the first message, causing the first S-CSCF to perform actions including:
obtaining, from a home subscriber database (HSS), an authentication to provide the service; and
saving, to the HSS, the IP address of the P-CSCF;
receiving, from the first S-CSCF, a response to the first message confirming the registration of the UE;
receiving, via a network, a second request to establish a call session with the UE;
obtaining, from the HSS, the IP address of the P-CSCF of the UE;
sending, to a second S-CSCF, a first invite associated with the second request;
determining that no response is received from the second S-CSCF after a pre-set time period;
sending, to a third S-CSCF, a second invite associated with the second request, the second invite including the IP address of the P-CSCF of the UE and causing the third S-CSCF to perform actions including:
obtaining an authentication to establish the call session; and
sending, to the P-CSCF associated with the UE, a third invite associated with the second request; and
receiving, via the network, a confirmation that the call session with the UE is established.

7. The device of claim 6, wherein transmitting, to the first S-CSCF, the first message, causing the first S-CSCF to perform actions further including:
decrypting the IP address of the P-CSCF from the first message;
encrypting the IP address of the P-CSCF using a second AVP; and
sending, to the HSS, a second message to authenticate the access of the service, the second message including the IP address of the P-CSCF encrypted using the second AVP.

8. The device of claim 6, wherein the third S-CSCF is caused to perform actions further including:
sending, to a telephony application server (TAS), a fourth invite associated with the second request, causing the TAS to establish the call session.

9. A non-transitory computer-readable storage medium storing computer-readable instructions, that when executed by a processor, cause the processor to implement an interrogating call session control function (I-CSCF) and perform actions of the I-CSCF comprising:
pre-registering, via a first serving call session control function (S-CSCF), the a user equipment (UE) in a network, including:
receiving, via the network, a first request to access a service from the UE, the first request an Internet Protocol (IP) address of a proxy call session control function (P-CSCF) associated with the UE;
generating a first message according to the first request to register the UE in the network;
transmitting, to the first S-CSCF, the first message, causing the first S-CSCF to perform actions including:
obtaining, from a home subscriber database (HSS), an authentication to provide the service; and
saving, to the HSS, the IP address of the P-CSCF;
receiving, from the first S-CSCF, a response to the first message confirming the registration of the UE;
receiving, via a network, a second request to establish a call session with the UE;
obtaining, from the HSS, the IP address of the P-CSCF of the UE;
sending, to a second S-CSCF, a first invite associated with the second request;
determining that no response is received from the second S-CSCF after a pre-set time period;
sending, to a third S-CSCF, a second invite including information associated with the P-CSCF of the UE, the second invite including the IP address of the P-CSCF of the UE and causing the third S-CSCF to perform actions including:
obtaining an authentication to establish the call session; and
sending, to the P-CSCF of the UE, a third invite associated with the request; and
receiving, via the network, a confirmation that the call session with the UE is established.

10. The non-transitory computer-readable storage medium of claim 9, wherein the actions further comprise:
encrypting the IP address of the P-CSCF using a first attribute value pair (AVP); and
generating the first message to include the IP address of the P-CSCF encrypted using the first AVP.

11. The non-transitory computer-readable storage medium of claim 10, wherein transmitting, to the first S-CSCF, the first message, causing the first -S-CSCF to perform actions further including:
decrypting the IP address of the P-CSCF from the first message;
encrypting the IP address of the P-CSCF using a second AVP; and
sending, to the HSS, a second message to authenticate the access of the IMS service, the second message including the IP address of the P-CSCF encrypted using the second AVP.

12. The non-transitory computer-readable storage medium of claim 9, wherein the third S-CSCF is caused to perform actions further including:
sending, to a telephony application server (TAS), a fourth invite associated with the second request, causing the TAS to establish the call session.

* * * * *